US006898686B1

United States Patent
Perez (10) Patent No.: US 6,898,686 B1
(45) Date of Patent: May 24, 2005

(54) MEMORY MAP ADJUSTMENT TO SUPPORT THE NEED OF ADAPTERS WITH LARGE MEMORY REQUIREMENTS

(75) Inventor: Michael Anthony Perez, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 875 days.

(21) Appl. No.: 09/645,175

(22) Filed: Aug. 24, 2000

(51) Int. Cl.[7] .............................................. G06F 12/02
(52) U.S. Cl. ........................ 711/170; 710/302; 713/100
(58) Field of Search ..................... 711/2, 166, 170–172, 711/4, 111–112, 202, 221, 115; 710/8–10, 104, 300–304, 13; 713/1–2, 100; 709/220–222; 714/1–5, 7, 42, 44

(56) References Cited

U.S. PATENT DOCUMENTS

| 5,737,542 | A | * | 4/1998 | Kurihara et al. ............. 710/301 |
| 6,205,503 | B1 | * | 3/2001 | Mahalingam ................ 710/302 |
| 6,247,079 | B1 | * | 6/2001 | Papa et al. ................... 710/302 |
| 6,311,242 | B1 | * | 10/2001 | Falkenburg et al. ......... 710/301 |
| 6,314,525 | B1 | * | 11/2001 | Mahalingham et al. ........ 714/4 |

FOREIGN PATENT DOCUMENTS

| JP | 2000-029818 | 1/2000 | ............ G06F/13/14 |
| JP | 2000-222346 | 8/2000 | ............ G06F/13/36 |

\* cited by examiner

Primary Examiner—Denise Tran
(74) Attorney, Agent, or Firm—Duke W. Yee; Mark E. McBurney; Gerald H. Glanzman (57) ABSTRACT

Method, system, and apparatus for allocating memory to a plurality of expansion slots in a data processing system. During initialization, firmware allocates memory among a plurality of expansion slots on a rigid basis. If an input/output adapter functionally connected to one of the plurality of expansion slots requires more memory, the firmware reallocates the memory among the plurality of expansion slots such that the expansion slot occupied by the input/output adapter is allocated sufficient memory. If during runtime, an input/output adapter is hotplugged into the system and requires more memory than allocated to the slot in which the input/output adapter has been inserted, the firmware reallocates memory, first from unoccupied expansion slots and then, if necessary, from selected ones of occupied expansion slots.

26 Claims, 3 Drawing Sheets

FIG. 1
100 DATA PROCESSING SYSTEM

MEMORY MAP ADJUSTMENT TO SUPPORT THE NEED OF ADAPTERS WITH LARGE MEMORY REQUIREMENTS

BACKGROUND OF THE INVENTION

1. Technical Field

The present invention relates to an improved data processing system and, more particular, to methods of memory mapping for I/O devices.

2. Description of Related Art

PCI I/O devices have on card memory and register space that needs to be mapped to system memory. There are two approaches to assigning memory space. The first approach is called dynamic allocation where the system "walks" all of the PCI buses, queries each device to determine how much space the device needs, and then assigns memory to each device based on needs. The second approach is a rigid approach where the data processing system has a set amount of memory space available on a per slot or per PCI Host Bridge basis.

The problem with dynamic allocation occurs when this is attempted in systems in which a large number of PCI Host bridges and PCI Host Bridges (PHB) exist that are located different drawers such as, for example, the RS/6000 server line. The RS/6000 server line is a line of products available from the International Business Machines Corporation of Armonk, N.Y. In the RS/6000 sever line, there can be upwards of 32 drawers where each drawer could have three (3) to six (6) PHBs. A problem also occurs with this approach when a hotplugging operation is performed if an adapter is added or an adapter is replaced with another adapter that needs additional space.

The problem with the fixed space is that it is too rigid. It works for today's devices and the devices that are planned for. However, the future is always unpredictable and it is quite likely that a future unpredictable device will be developed that will break the design. Therefore, there is a need for a flexible approach to memory mapping that overcomes the obstacles associated with fixed space designs, as well as overcoming problems associated with systems having a large number of PCI host bridges.

SUMMARY OF THE INVENTION

The present invention provides a method, system, and apparatus for allocating memory to a plurality of expansion slots in a data processing system. In one embodiment, during initialization of the data processing system, firmware allocates memory among a plurality of expansion slots on a rigid basis. Responsive to a determination that an input/output adapter functionally connected to one of the plurality of expansion slots requires more memory allocation than allocated previously, the firmware reallocates the memory among the plurality of expansion slots such that the one of the expansion slots occupied by the input/output adapter is allocated sufficient memory. If during runtime, an input/output (I/O) adapter is hotplugged into the system and requires more memory than allocated to the slot in which the I/O has been inserted into, then the firmware reallocates memory, first from unoccupied expansion slots and then, if necessary, from selected ones of occupied expansion slots such that all of the I/O adapters within the system are allocated sufficient memory to function correctly and optimally.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
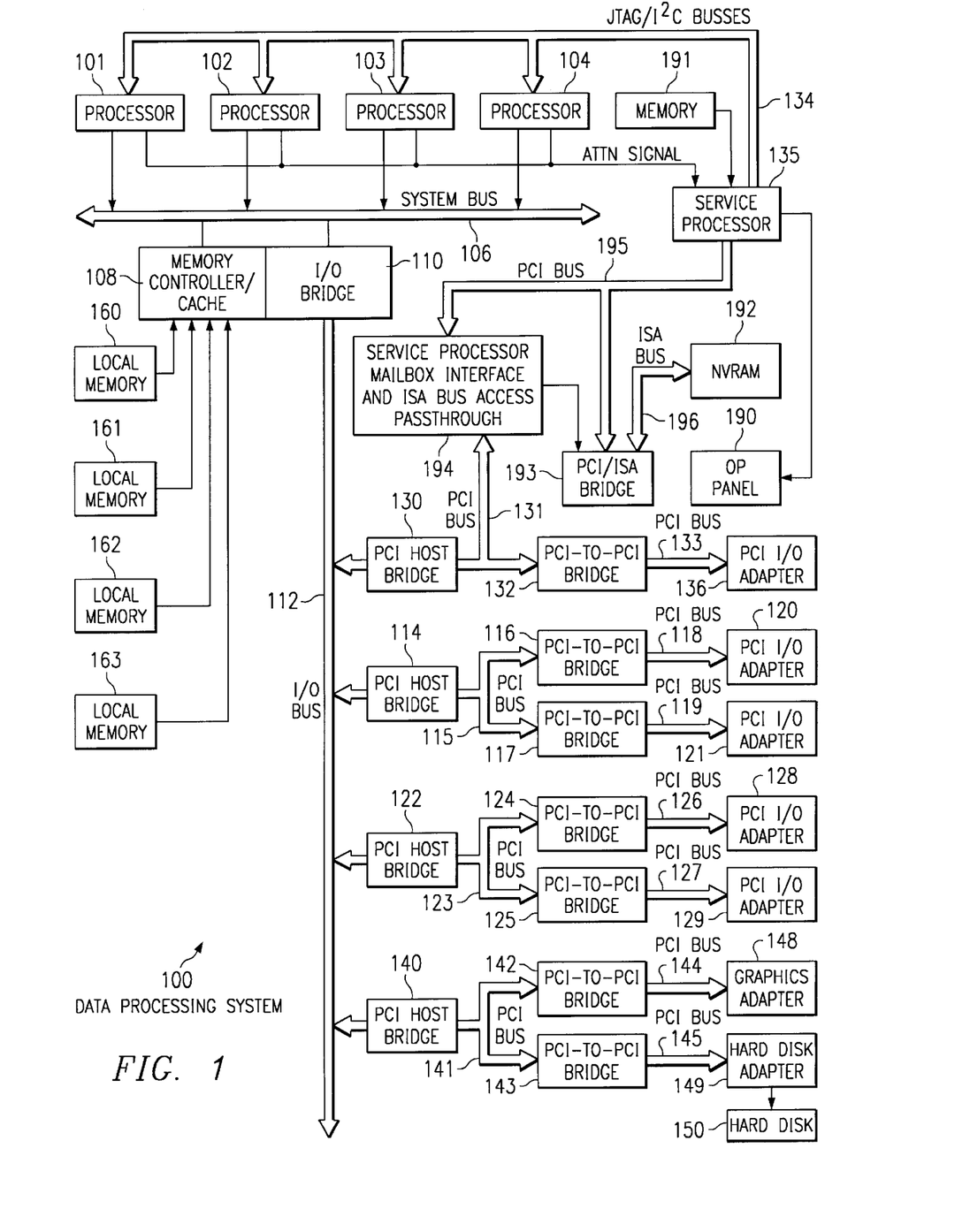
FIG. 1 depicts a block diagram of a data processing system in which the present invention may be implemented.

With reference now to the figures, and in particular with reference to FIG. 1, a block diagram of a data processing system in which the present invention may be implemented is depicted. Data processing system 100 may be a symmetric multiprocessor (SMP) system including a plurality of processors 101, 102, 103, and 104 connected to system bus 106. For example, data processing system 100 may be an IBM RS/6000, a product of International Business Machines Corporation in Armonk, N.Y., implemented as a server within a network. Alternatively, a single processor system may be employed. Also connected to system bus 106 is memory controller/cache 108, which provides an interface to a plurality of local memories 160–163. I/O bus bridge 110 is connected to system bus 106 and provides an interface to I/O bus 112. Memory controller/cache 108 and I/O bus bridge 110 may be integrated as depicted. An operating system, such as, for example, the Advanced Interactive Executive (AIX) operating system, a product of the International Business Machines Corporation of Armonk, N.Y., may run on data processing system 100.

Peripheral component interconnect (PCI) Host bridge 114 connected to I/O bus 112 provides an interface to PCI local bus 115. A number of Input/Output adapters 120–121 may be connected to PCI bus 115 through a respective one of PCI-to-PCI bridges 116–117 via a respective one of PCI buses 118–119. Typical PCI bus implementations will support between four and eight I/O adapters (i.e. expansion slots for add-in connectors). Each I/O Adapter 120–121 provides an interface between data processing system 100 and input/output devices such as, for example, other network computers, which are clients to data processing system 100.

An additional PCI host bridge 112 provide an interface for an additional PCI bus 123. PCI bus 123 is connected to a plurality of PCI-to-PCI bridges 124–125 which are in turn each connected to a respective one of PCI I/O adapters 128–129 by a respective one of PCI buses 126–127. Thus, additional I/O devices, such as, for example, modems or networks adapters may be supported through each of PCI I/O adapters 128–129. In this manner, data processing system 100 allows connections to multiple network computers. Each of PCI-to-PCI bridges 116–117, 124–125, 142–143, and 132 is connected to a single I/O adapter.

A member mapped graphics adapter 148 may be connected to I/O bus 112 through PCI Host Bridge 140 and PCI-to-PCI Bridge 142 via PCI buses 141 and 144 as depicted. A hard disk 150 may also be connected to I/O bus 112 through PCI Host Bridge 140 and PCI-to-PCI Bridge 143 via PCI buses 141 and 145 as depicted.

A PCI host bridge 130 provides an interface for a PCI bus 131 to connect to I/O bus 112. PCI bus 131 connects PCI host bridge 130 to the service processor mailbox interface and ISA bus access passthrough logic 194 and PCI-to-PCI Bridge 132. The ISA bus access passthrough logic 194 forwards PCI accesses destined to the PCI/ISA bridge 193. The NV-RAM storage is connected to the ISA bus 196. The Service processor 135 is coupled to the service processor mailbox interface 194 through its local PCI bus 195.

Service processor 135 is also connected to processors 101–104 via a plurality of JTAG/I$^2$C buses 134. JTAG/I$^2$C buses 134 are a combination of JTAG/scan busses (see IEEE 1149.1) and Phillips I$^2$C busses. However, alternatively, JTAG/I$^2$C buses 134 may be replaced by only Phillips I$^2$C busses or only JTAG/scan busses. All SP-ATTN signals of the host processors 101, 102, 103, and 104 are connected together to an interrupt input signal of the service processor. The service processor 135 has its own local memory 191, and has access to the hardware op-panel 190. Service processor 135 is responsible for saving and reporting error information related to all the monitored items in data processing system 100. Service processor 135 also takes action based on the type of errors and defined thresholds.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

Figure 2:
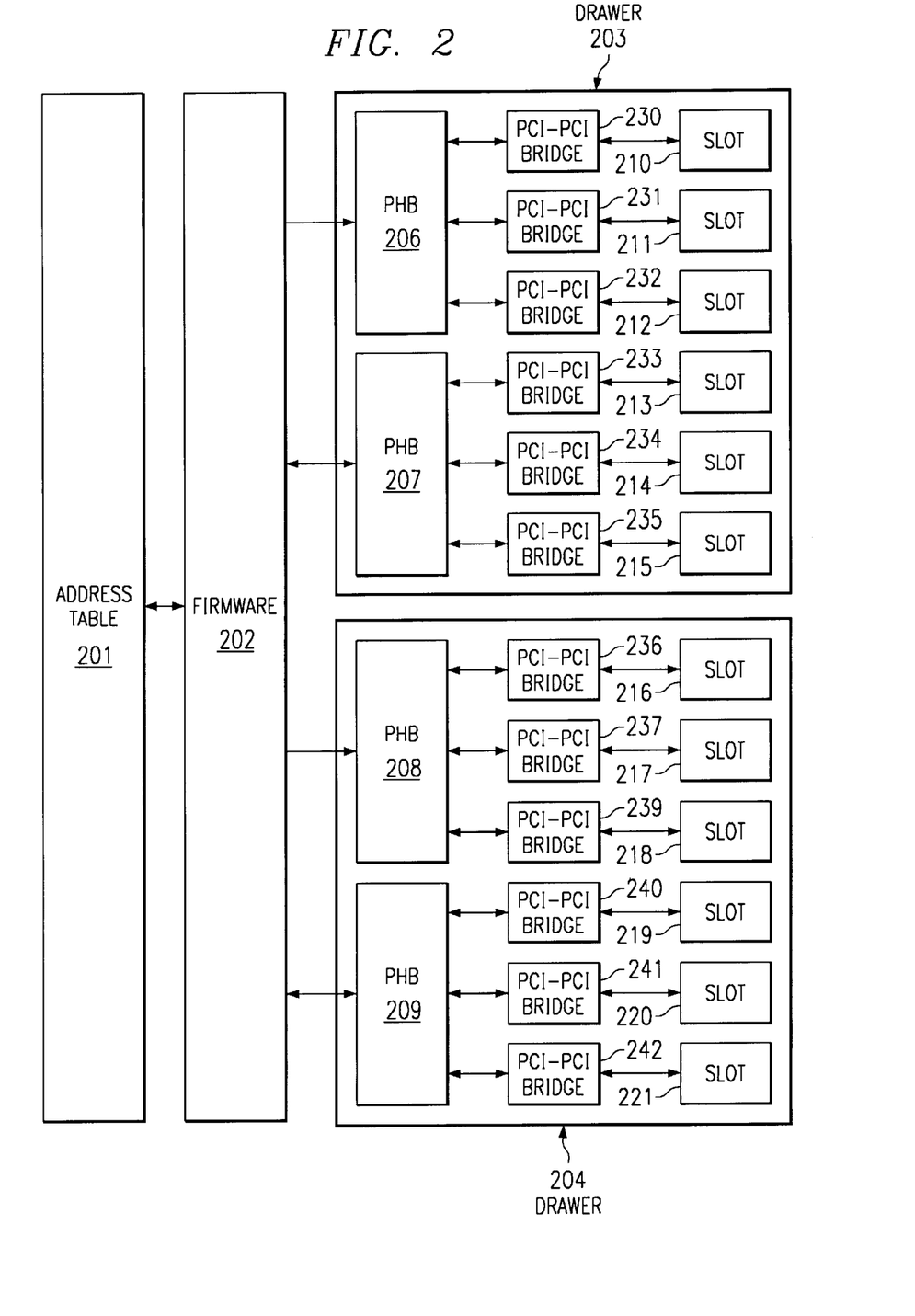
FIG. 2 depicts a block diagram illustrating a system for adjusting a memory map of slots beneath PHBs in accordance with the present invention.

With reference now to FIG. 2, a block diagram illustrating a system for adjusting a memory map of slots beneath PHBs is depicted in accordance with the present invention. System 200 may be implemented within a data processing system, such as, data processing system 100 in FIG. 1. System 200 includes firmware for adjusting memory allocation in an address table 201 for a plurality of slots 210–211 beneath a plurality of PHBs 206–209 connected via PCI—PCI bridges 230–242.

Firmware 202 may be implemented, for example, as set of instructions stored in NVRAM 192 and executed in service processor 135 in FIG. 1. Address table may be stored in a non-volatile memory, such as, for example, in memory 191 in NVRAM 192 depicted in FIG. 1. PHBs 206–209 may be implemented as PCI Host Bridges 114, 122, 130, and 140 in FIG. 1. PCI—PCI bridges 230–242 may be implemented as, for example, any one of PCI-to-PCI bridges 116–117, 124–125, 132 and 142–143 in FIG. 1. Slots 210–221 are expansion slots in which I/O adapters, such as, for example, PCI I/O adapters 120–121, 128–129, and 136 as well as graphics adapter 148 and hard disk adapter 149 may be plugged into for connection to a data processing system.

System 100 utilizes a hybrid approach to allocate memory space to each slot 210–221 in a rigid manner in a first pass of configuration. Thus, during bootup of the data processing system, firmware 202 allocates available memory to each drawer 203 and 204 in a rigid manner with a predetermined amount of memory allocated to each drawer 203 and 204. The amounts of memory allocated to each drawer 203 and 204 may be equal or may not be equal depending on the needs of the developer for the particular implementation. The memory allocated to each drawer 203 and 204 is then further allocated among the PHBs 206–209 in each drawer 203 and 204 by firmware 202. Firmware 202 than further allocates the memory allocated to each of PHBs 206–209 to each of slots 210–221 assigned and connected to each of PHBs 206–209.

After available memory has been allocated among the various slots 210–221, firmware 202 checks the I/O adapter connected to each slot 210–221 to determine whether the I/O adapter need more memory than has been allocated to the slot in which it is connected. If a particular I/O adapter needs more memory, then firmware 202 reallocates the memory allocated to the particular PHB 206–209 in which the I/O adapter needing more memory is connected such that the slot in which the I/O adapter needing more money is allocated sufficient memory to satisfy the I/O adapter. The other slots beneath the particular PHB in which the I/O adapter that required more memory are adjusted so that each of these slots is assigned a different amount of memory such that all of the memory allocated to the PHB is assigned to each slot in a manner in which each I/O adapter has sufficient memory to allocated to it to perform properly. In order to adjust the appropriate ones of slots 210–221, firmware 202 reprograms the PCI-PCI bridges 230–242 associated with each affected one of slots 210–221.

In reassigning the other slots and the adjusted slot, firmware 202 needs to take care to spread any available amount of unused memory evenly between the slots. This is done to prevent the least amount of problems for hotplug. For example if firmware 202 has 512 MB to divide between 7 slots and one adapter needed 128 MB and the other adapters need no more than 8 MB, then firmware 202 needs to assign the first slot 128 MB and the Firmware 202 then resets the address table 201 to reflect the allocation of memory that firmware 202 has assigned to each drawer 203–204, each PHB 206–209, and each slot 210–221. Thus, at the completion of bootup, firmware 202 has assigned all available memory between drawers 203 and 204. The memory allocated to each drawer 203 and 204 has then been further allocated between the various PHBs 206–209 within each drawer 203 and 204 and the memory allocated to each PHB 206–209 has then been further allocated to each slot 210–221 beneath each PHB 206–209 such that each I/O adapter connected to the slots 210–221 has sufficient memory allocated to it in order to perform correctly.

If later during runtime, an I/O adapter in one of slots 210–221 is replaced in a hotplug operation with a new I/O adapter that requires memory to be allocated to it than has been allocated to the one of slot 210–221 previously, then firmware 202, firmware uses an algorithm to take memory allocated to unoccupied slots and allocate it to the new I/O adapter's slot. If this does not provide sufficient memory for the I/O adapter, firmware 202 queries a user to determine which of the adapters connected to the particular one of PHBs 206–209 that is affected by the hoping operation to determine which I/O adapters may be temporarily "brought down" to perform an address reassignment. Firmware 202 will also give the user the option to reboot for reconfiguration as an alternative. The user should not have to do both. The user should either reboot and let firmware reset everything or the user should let the firmware take specified adapters down and readjust. One reason to reboot rather than take down a few I/O adapters is that the readjustment may require too many applications to be stopped individually which may end up taking longer than rebooting due to the administor trying to determine all the dependency applications that need to be stopped and then later restarted since only a few cards will be taken down for readjustment.

Firmware 202 then reprograms slots by adjusting the pci—pci bridge settings and the address table 201 uses for address assignments, such that the new I/O adapter, as well as the other I/O adapters that were reprogrammed, have sufficient memory allocated such that the I/O adapters may perform correctly and optimally. The adapters that were temporarily taken "down" are then re-enabled.

Those of ordinary skill in the art will appreciate that the hardware depicted in FIG. 2 may vary. For example, more drawers and PHBs may be utilized than depicted in FIG. 2. In many implementations, the data processing system may contain 32 drawers or more with each drawer containing 3–6 PHBs. Thus, the depicted example is not meant to imply architectural limitations with respect to the present invention.

As an aid in understanding the present invention, consider the following example. Suppose that a data processing system contains 10 slots under one of the PHBs within the system with 1 GB (i.e. 1024 MB) available based on a rigid allocation of memory to the PHB. The memory space is divided on a slot by slot basis since each slot is it own bus behind its own pci—pci bridge. Thus, in this approach, the firmware assigns 128 MB to 6 slots an 64 MB to the other 4 slots. If the firmware encounters an adapter that requires more than 128, then the firmware needs to follow an algorithm for adjusting the other nine slots beneath the PHB. The firmware does this by reprogramming the pci—pci bridges and resetting the address table it uses to assign addresses.

If later, an adapter requiring 256 MB is hotplugged into one of the slots that has been allocated with 128 MB or 64 MB, then memory allocated to any unused slots is allocated to the slot containing the new adapter and, if this is not sufficient, other slots, as selected by a user, are reprogrammed and the address table reset such that the new adapter has sufficient memory available to perform correctly and optimally.

Figure 3:
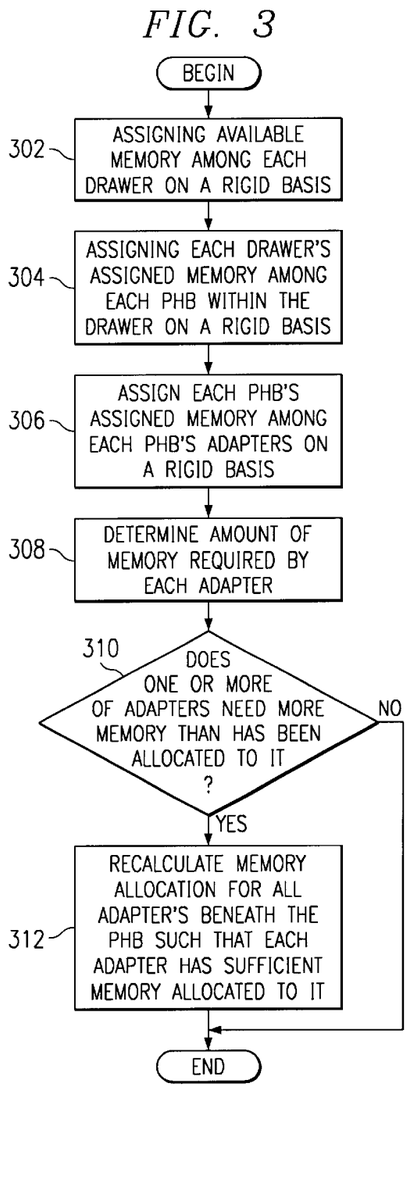
FIG. 3 depicts a flowchart illustrating an exemplary method of assigning memory to I/O expansion slots within a data processing system at bottime in accordance with the present invention.

With reference now to FIG. 3, a flowchart illustrating an exemplary method of assigning memory to I/O expansion slots within a data processing system at boottime is depicted in accordance with the present invention. To begin, firmware assigns available memory among each drawer within the data processing system on rigid predetermined basis (step 302). The firmware then assigns each drawer's allocated memory among each PHB within the drawer on a rigid predetermined basis (step 304). Next, the firmware assigns each PHB's allocated memory among each of the PHB's adapter slots on a rigid basis (step 306).

The firmware then determines the amount of memory required by each adapter for each PHB for each drawer (step 308) and then determines whether one or more adapters need more memory than has been allocated for that adapter's slot (step 310). If no adapters need more memory than has been allocated to the corresponding slot for the adapter, then the process ends. If, however, one or more adapters need more memory than has been allocated, the firmware recalculates the memory allocation for all the adapter slots beneath the PHB to which the affected adapter is connected such that each adapter has sufficient memory allocated to it (step 312). Thus, after completion of the initialization process, each adapter slot has sufficient memory allocated to it to function properly and optimally.

Figure 4:
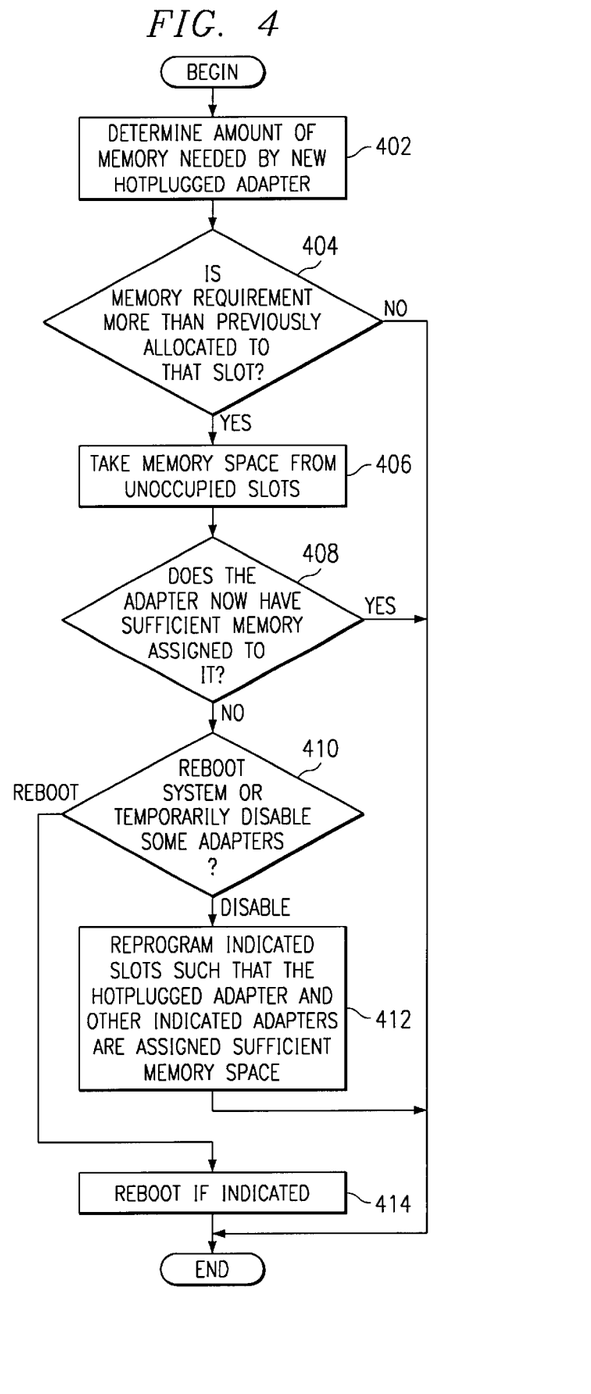
FIG. 4 depicts a flowchart illustrating an exemplary method of reallocating memory to expansion slots after an adapter has been hotplugged into the data processing system during runtime in accordance with the present invention.

With reference now to FIG. 4, a flowchart illustrating an exemplary method of reallocating memory to expansion slots after an adapter has been hotplugged into the data processing system during runtime is depicted in accordance with the present invention. After a new I/O adapter has been hotplugged into an expansion slot, either to replace an I/O adapter or as an additional I/O adapter into a previously unoccupied slot, the firmware determines the amount of memory needed by the new hotplugged adapter (step 402). The firmware then determines whether the amount of memory needed by the new hotplugged adapter is more than had bee previously allocated to the slot in which the hotplugged adapter has been placed (step 404). If the memory requirement is less than or equal to the amount of memory allocated to the slot, then the process ends. If the memory requirement of the hotplugged adapter is more than allocated to the slot, then the firmware takes memory space allocated to unoccupied slots, if any, and assigns this memory to the slot containing the new hotplugged adapter (step 406) and updates the address table to reflect the new allocation.

The firmware then determines whether the slot containing the new hotplugged adapter has been allocated sufficient memory to service the new adapter (step 408). If sufficient memory has been allocated to the new adapter, then the process ends. If the adapter still needs more memory than has been allocated after taking memory from unoccupied slots, then the firmware queries the user as to whether the system should be rebooted or whether some adapters should be disabled (step 410). If some adapters should be disabled, then the user is queried for the identity of adapters that can be temporarily disabled for address reassignment as well as inquiries of the user whether the data processing system should be rebooted upon completion of the address reassignment. The firmware then disables and reprograms PCI—PCI bridges for the slots indicated by the user, such that the indicated slots have sufficient memory allocated to them while still freeing up enough memory for the new adapter, and then reprograms the new adapter to reflect the newly allocated memory (step 412). The address table is then reset by the firmware to reflect the new allocation of memory.

If there are to many adapters that need to be taken down or if too many executing applications will be disturbed by taking down some of the adapters, then the user may wish to simply reboot the entire system rather than determine which adapters to temporarily take down. Thus, if the user chooses to reboot, the data processing system is then rebooted (step 414) and the reallocation of memory is performed during the boot process.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for allocating memory to a plurality of expansion slots in data processing system, the method comprising:

during initialization of the data processing system:
allocating memory among the plurality of expansion slots on a rigid basis; and
responsive to a determination that an input/output adapter functionally connected to one of the plurality of expansion slots requires more memory allocation than allocated to the one of the plurality of expansion slots, reallocating the memory among the plurality of expansion slots such that the one of the expansion slots occupied by the input/output adapter is allocated sufficient memory; and during runtime:
responsive to a new input/output adapter being hotplugged into selected one of the plurality of expansion slots that requires more memory than has been allocated to the selected one of the plurality of expansion slots, reallocating memory from unoccupied ones of the plurality of expansion slots to the selected one of the plurality of expansion slots.

2. The method as recited in claim 1, wherein the reallocation of memory comprises updating an address table.

3. A method for allocating memory to a plurality of expansion slots in a data processing system, the method comprising:

during initialization of the data processing system:
allocating memory among the plurality of expansion slots on a rigid basis; and
responsive to a determination that an input/output adapter functionally connected to one of the plurality of expansion slots requires more memory allocation than allocated to the one of the plurality of expansion slots, reallocating the memory among the plurality of expansion slots such that the one of the expansion slots occupied by the input/output adapter is allocated sufficient memory, and during runtime:
responsive to a new input/output adapter being hotplugged into a selected one of the plurality of expansion slots that requires more memory than has been allocated to the selected one of the plurality of expansion slots, reallocating memory from unoccupied ones of the plurality of expansion slots to the selected one of the plurality of expansion slots;
responsive to a determination that the new input/output adapter require more memory allocation than reallocated from the unoccupied ones of the plurality of expansion slots, temporarily deconfiguring suitable ones of the plurality of old input/output adapters occupying others of the plurality of expansion slots; and
reallocating memory from the others of the plurality of expansion slots to the one of the plurality of expansion slots occupied by the new input/output adapter.

4. The method as recited in claim 3, wherein the suitable ones are determined by a user.

5. The method as recited in claim 3, further comprising: rebooting the data processing system.

6. A method for allocating memory to a plurality of expansion slots in a data processing system during runtime, the method comprising:

determining an amount of memory required by a hotplugged input/output adapter; and responsive to a determination that more memory is required than has been allocated to an expansion slot occupied by the hotplugged input/output adapter, reallocating memory assigned to unoccupied expansion slots to the expansion slot occupied by the hotplugged input/output adapter.

7. A method for allocating memory to a plurality of expansion slots in a data processing system during runtime, the method comprising:

determining an amount of memory required by a hotplugged input/output adapter;

responsive to a determination that more memory is required than has been allocated to an expansion slot occupied by the hotplugged input/output adapter, reallocating memory assigned to unoccupied expansion slots to the expansion slot occupied by the hotplugged input/output adapter;

responsive to a determination that the hotplugged input/output adapter requires more memory allocation than reallocated from the unoccupied expansion slots, temporarily deconfiguring suitable ones of old input/output adapters in occupied expansion slots; and reallocating memory from the occupied expansion slots corresponding to the suitable ones of old input/output adapters to the expansion slot occupied by the hotplugged input/output adapter.

8. The method as recited in claim 7, further comprising: rebooting the data processing system.

9. A computer program product in a computer readable media for use in a data processing system for allocating memory to a plurality of expansion slots in a data processing system, the computer program product comprising:

during initialization of the data processing system:
first instructions for allocating memory among the plurality of expansion slots on a rigid basis; and
second instructions, responsive to a determination that an input/output adapter functionally connected to one of the plurality of expansion slots requires more memory allocation than allocated to the one of the plurality of expansion slots, for reallocating the memory among the plurality of expansion slots such that the one of the expansion slots occupied by the input/output adapter is allocated sufficient memory; and during runtime:
third instructions, responsive to a new input/output adapter being hotplugged into a selected one of the plurality of expansion slots that requires more memory than has been allocated to the selected one of the plurality of expansion slots, for reallocating memory from unoccupied ones of the plurality of expansions slots to the selected one of the plurality of expansion slots.

10. The computer program product as recited in claim 9, wherein the allocation of memory comprises updating an address table.

11. A computer program product in a computer readable media for use in a data processing system for allocating memory to a plurality of expansion slots in a data processing system, the computer program product comprising:

during initialization of the data processing system:
first instructions for allocating memory among the plurality of expansion slots on a rigid basis; and
second instructions, responsive to a determination that an input/output adapter functionally connected to one of the plurality of expansion slots requires more memory allocation than allocated to the one of the plurality of expansion slots, for reallocating the memory among the plurality of expansion slots such that the one of the expansion slots occupied by the input/output adapter is allocated sufficient memory; and during runtime;

third instructions, responsive to a new input/output adapter being hotplugged into selected one of the plurality of expansion slots that require more memory than has been allocated to the selected one of the plurality of expansion slots, for reallocating memory from unoccupied ones of the plurality of expansion slots to the selected one of the plurality of expansion slots;

fourth instructions, responsive to a determination that the new input/output adapter requires more memory allocation than reallocated from the unoccupied ones of the plurality of expansion slots, for temporarily deconfiguring suitable ones of the plurality of old input/output adapters occupying others of the plurality of expansion slots; and fifth instructions for reallocating memory from the others of the plurality of expansion slots to the one of the plurality of expansion slots occupied by the new input/output adapter.

12. The computer program product as recited in claim 11, wherein the suitable ones are determined by a user.

13. The computer program product as recited in claim 11, further comprising:

sixth instructions for rebooting the data processing system.

14. A computer program product in a computer readable media for use in a data processing for allocating memory to a plurality of expansion slots in the data processing system during runtime, the computer program product comprising:

first instructions for determining an amount of memory required by a hotplugged input/output adapter; and said instructions, responsive to a determination that more memory is required than has been allocated to an expansion slot occupied by the hotplugged input/output adapter, for reallocating memory assigned to unoccupied expansion slots to the expansion slot occupied by the hotplugged input/output adapter.

15. A computer program product in a computer readable media for use in a data processing system for all allocating memory to a plurality of expansion slots in the data processing system during runtime, the computer program product comprising:

first instructions for determining an amount of memory required by a hotplugged input/output adapter;

second instructions, responsive to a determination that more memory is required than has been allocated in an expansion slot occupied by the hotplugged input/output adapter, for reallocating memory assigned to unoccupied expansion slots to the expansion slot occupied by the hotplugged input/output adapter;

third instructions, responsive to a determination that the hotplugged input/output adapter requires more memory allocation than reallocated from the unoccupied expansion slots, for temporarily deconfiguring suitable ones of old input/output adapters in occupied expansion slots; and fourth instructions for reallocating memory from the occupied expansion slots corresponding to the suitable ones of old input/output adapters to the expansion slot occupied by the hotplugged input/output adapter.

16. The computer program product as recited in claim 15, further comprising:

fifth instructions for rebooting the data processing system.

17. A system for allocating memory to a plurality of expansion slots in a data processing system, the system comprising:

during initialization of the data processing system:

first means, for allocating memory among the plurality of expansion slots on a rigid basis; and second means, responsive to a determination that an input/output adapter functionally connected to one of the plurality of expansion slots requires more memory allocation than allocated to the one of the plurality of expansion slots, for reallocating the memory among the plurality of expansion slots such that the one of the expansion slots occupied by the input/output adapter is allocated sufficient memory; and during runtime:

third means, responsive to a new input/output adapter being hotplugged into selected one of the plurality of expansion slots that requires more memory than has been allocated to the selected one of the plurality of expansion slots, for reallocating memory from unoccupied ones of the plurality of expansion slots to the selected one of the plurality of expansion slots.

18. The system as recited in claim 17, wherein the reallocation of memory comprises updating an address table.

19. A system for allocating memory to a plurality of expansion slots in a data processing system, the system comprising:

during initialization of the data processing system;

first means for allocating memory means among the plurality of expansion slots on a rigid basis; and second means, responsive to a determination that an input/output adapter functionally connected to one of the plurality of expansion slots require more memory allocation than allocated to the one of the plurality of expansion slots, for reallocating the memory among the plurality of expansion slots such that the one of the expansion slots occupied by the input/output adapter is allocated sufficient memory; and during runtime:

third means, responsive to a new input/output adapter being hotplugged into selected one of the plurality of expansion slots that requires more memory than has been allocated to the selected one of the plurality of expansion slots, for reallocating memory from unoccupied ones of the plurality of expansion slots to the selected one of the plurality of expansion slots;

fourth means, responsive to a determination that the new input/output adapter requires more memory allocation than reallocated from the unoccupied ones of the plurality of expansion slots, for temporarily deconfiguring suitable ones of the plurality of old input/output adapters occupying others of the plurality of expansion slots; and fifth means for reallocating memory from the others of the plurality of expansion slots to the one of the plurality of expansion slots occupied by the new input/output adapter.

20. The system as recited in claim 19, wherein the suitable ones are determined by user.

21. The system as recited in claim 19, further comprising:

sixth means for rebooting the data processing system.

22. A system for allocating memory to a plurality of expansion slots in a data processing system during runtime, the system comprising:

first means for determining an amount of money required by a hotplugged input/output adapter; and second means, responsive to determination that more memory is required than has been allocated to an expansion slot occupied by the hotplugged input/output adapter, for reallocating memory assigned to unoccupied expansion slots to the expansion slot occupied by the hotplugged input/output adapter.

23. A system for allocating memory to a plurality of expansion slots in a data processing system during runtime, the system comprising:

first means for determining an amount of memory required by a hotplugged input/output adapter; and second means, responsive to a determination that more memory is required than has been allocated to an expansion slot occupied by the hotplugged input/output adapter, for reallocating memory assigned to unoccupied expansion slots to the expansion slot occupied by the hotplugged input/output adapter;

third means, responsive to a determination that the hotplugged input/output adapter requires more memory allocation than reallocated from the unoccupied expansion slots, for temporarily deconfiguring suitable ones of old input/output adapters in occupied expansion slots; and fourth means for reallocating memory from the occupied expansion slots corresponding to the suitable ones of old input/output adapters to the expansion slot occupied by the hotplugged input/output adapter.

24. The system as recited in claim 23, further comprising:

fifth means for rebooting the data processing system.

25. A method for allocating memory to expansion slots in a data processing system, the method comprising:

during initialization of the data processing system:
allocating memory assigned to a host bridge among a plurality of a expansion slots on a predetermined basis; and responsive to a determination that an input/output adapter connected to one of the plurality of expansion slots requires more memory than allocated to the one of the plurality of expansion slots, reallocating the memory among the plurality of expansion slots, such that the memory requirements of the input/output adapter are satisfied; and during runtime, responsive to a determination that a new input/output adapter has been hotplugged into one of the plurality of expansion slots;

determining the memory requirements of the new input/output adapter; and responsive to a determination that the memory requirements exceed the memory allocated to the one of the plurality of expansion slots occupied by the new input/output adapter, reallocating some of the memory allocated to unoccupied ones of the plurality of expansion slots to the one of the plurality of expansion slots occupied by the new input/output adapter.

26. A method for allocating memory to expansion slots in a data processing system, the method comprising:

during initialization of the data processing system:
allocating memory assigned to a host bridge among a plurality of a expansion slots on a predetermined basis; and responsive to a determination that an input/output adapter connected to one of the plurality of expansion slots requires more memory than allocated to the one of the plurality of expansion slots, reallocating the memory among the plurality of expansion slots, such that the memory requirements of the input/output adapter are satisfied; and during runtime, responsive to a determination that a new input/output adapter has been hotplugged into one of the plurality of expansion slots;

determining the memory requirements of the new input/output adapter; and responsive to a determination that the memory requirements exceed the memory allocated to the one of the plurality of expansion slots occupied by the new input/output adapter, reallocating some of the memory allocated to unoccupied ones of the plurality of expansion slots to the one of the plurality of expansion slots occupied by the new input/output adapter; and responsive to a determination that more memory is required by the new input/output adapter after reallocation of memory from unoccupied ones of the plurality of expansion slots, determining which of a plurality of old adapters connected to others of the plurality of expansion slots may be disabled;

disabling determined ones of the plurality of old adapters; and reallocating some memory from the ones of the plurality of expansion slots occupied by the determined ones of the plurality of old adapters to the one of the plurality of expansion slots occupied by the new input/output adapter such that sufficient memory is allocated to the one of the plurality of expansion slots occupied by the new input/output adapter and sufficient memory is allocated to the ones of the plurality of expansion slots occupied by the determined ones of the plurality of old input/output adapters.

* * * * *

UNITED STATES PATENT AND TRADEMARK OFFICE
CERTIFICATE OF CORRECTION

PATENT NO.    : 6,898,686 B1
DATED         : May 24, 2005
INVENTOR(S)   : Perez

It is certified that error appears in the above-identified patent and that said Letters Patent is hereby corrected as shown below:

Column 2,
Line 54, after "bridge" delete "112" and insert -- 122 --.

Column 3,
Line 40, after "of slots" delete "210-211" and insert -- 210-221 --.
Line 43, after "as" insert -- a --.

Column 7,
Line 49, after "adapter" delete "require" and insert -- requires --.

Column 9,
Line 46, after "system for" delete "all".

Column 10,
Line 8, after "first means" delete ",".
Line 33, after "memory" delete "means".
Line 37, after "slots" delete "require" and insert -- requires --.

Column 11,
Line 1, after "amount of" delete "money" and insert -- memory --.
Line 3, after "responsive to" insert -- a --.

Signed and Sealed this

Tenth Day of January, 2006

JON W. DUDAS
*Director of the United States Patent and Trademark Office*